(12) United States Patent
Takahashi

(10) Patent No.: US 11,580,566 B2
(45) Date of Patent: Feb. 14, 2023

(54) STORE SYSTEM, INFORMATION PROCESSING APPARATUS, AND INFORMATION PROCESSING METHOD THEREFOR

(71) Applicant: TOSHIBA TEC KABUSHIKI KAISHA, Tokyo (JP)

(72) Inventor: Shuji Takahashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 17/199,049

(22) Filed: Mar. 11, 2021

(65) Prior Publication Data

US 2021/0304236 A1 Sep. 30, 2021

(30) Foreign Application Priority Data

Mar. 24, 2020 (JP) .............................. JP2020-053276

(51) Int. Cl.
*G06F 3/0482* (2013.01)
*G06Q 30/0201* (2023.01)
*G06Q 30/0601* (2023.01)
*G06Q 30/02* (2023.01)
*H04L 9/40* (2022.01)
*G06F 3/0488* (2022.01)
*G06F 16/2457* (2019.01)
*G06Q 30/0207* (2023.01)

(52) U.S. Cl.
CPC ....... *G06Q 30/0206* (2013.01); *G06F 3/0482* (2013.01); *G06F 3/0488* (2013.01); *G06F 16/24578* (2019.01); *G06Q 30/0281* (2013.01); *G06Q 30/0633* (2013.01); *H04L 63/08* (2013.01); *G06Q 30/0236* (2013.01)

(58) Field of Classification Search
CPC ............ G06Q 30/0206; G06Q 30/0281; H04L 63/08; G06F 3/0488; G06F 3/0482; G06F 16/24578
See application file for complete search history.

(56) References Cited

U.S. PATENT DOCUMENTS

| | | | | |
|---|---|---|---|---|
| 8,321,270 | B2 * | 11/2012 | Antonucci | G06Q 30/0283 705/16 |
| 9,747,632 | B2 * | 8/2017 | Hicks | G06Q 30/0641 |
| 9,832,610 | B2 * | 11/2017 | Herz | G06Q 40/08 |
| 10,445,672 | B2 * | 10/2019 | Renfroe | G06Q 30/0635 |
| 10,740,780 | B2 * | 8/2020 | Ross | G06Q 30/0224 |

(Continued)

FOREIGN PATENT DOCUMENTS

JP 2014010822 A 1/2014

*Primary Examiner* — Anil K Bhargava
(74) *Attorney, Agent, or Firm* — Kim & Stewart LLP

(57) ABSTRACT

In accordance with an embodiment, an information processing apparatus acquires a rank of a visiting user and an amount according to the ranking. The information processing apparatus acquires a price at an own store of a commodity that the user has selected for purchase. The information processing apparatus acquires a price at another store of the commodity that the user has selected for purchase. In a case in which the price at the own store is higher than the price at the other store, the information processing apparatus adds an amount based on a difference in price therebetween to the amount according to the ranking, which is acquired by a first acquisition means.

10 Claims, 16 Drawing Sheets

(56) References Cited

U.S. PATENT DOCUMENTS

| | | | |
|---|---|---|---|
| 11,210,731 B1* | 12/2021 | Croak | G06Q 20/202 |
| 2013/0288715 A1* | 10/2013 | Shieh | H04W 4/21 |
| | | | 455/456.3 |
| 2013/0339195 A1* | 12/2013 | Nogi | G06Q 30/06 |
| | | | 705/27.1 |
| 2014/0365867 A1* | 12/2014 | Kawasaki | G06F 16/958 |
| | | | 715/234 |
| 2017/0046773 A1* | 2/2017 | Hendricks, II | G06Q 30/0635 |
| 2018/0276699 A1* | 9/2018 | Leekkala | G06Q 20/20 |
| 2020/0168003 A1* | 5/2020 | Zhou | G06T 19/006 |
| 2022/0156804 A1* | 5/2022 | Inagawa | G06Q 30/0281 |

* cited by examiner

| RANK | CUMULATIVE PURCHASE AMOUNT |
|---|---|
| A | ¥5,0000 OR MORE |
| B | ¥4,0000 OR MORE |
| C | ¥3,0000 OR MORE |
| D | ¥2,0000 OR MORE |
| E | ¥1,0000 OR MORE |
| F | ¥5,000 OR MORE |

Fig.3

STORE SYSTEM, INFORMATION PROCESSING APPARATUS, AND INFORMATION PROCESSING METHOD THEREFOR

CROSS-REFERENCE TO RELATED APPLICATION

This application is based upon and claims the benefit of priority from the prior Japanese Patent Application No. 2020-053276, filed on Mar. 24, 2020, the entire contents of which are incorporated herein by reference.

FIELD

An embodiment described here generally relates to a store system, an information processing apparatus, and an information processing method therefor.

BACKGROUND

In recent years, various store systems have been devised to promote sales by providing users who are purchasers with information for prompting to purchase commodities when they shops at a store. Moreover, some stores also promote sales by ranking users on the basis of their purchase records and the like and giving the users rewards according to their ranks. However, the user can compare the price of a commodity-to-be-purchased with that of the same commodity sold at another store and choose not to purchase the commodity there in a case where the price of the commodity-to-be-purchased is higher. Therefore, there is a fear that the sales opportunity may be missed.

BRIEF DESCRIPTION OF THE DRAWINGS

FIG. 3 is a diagram schematically showing an example of a rank table according to the embodiment.

DETAILED DESCRIPTION

Figure 1:
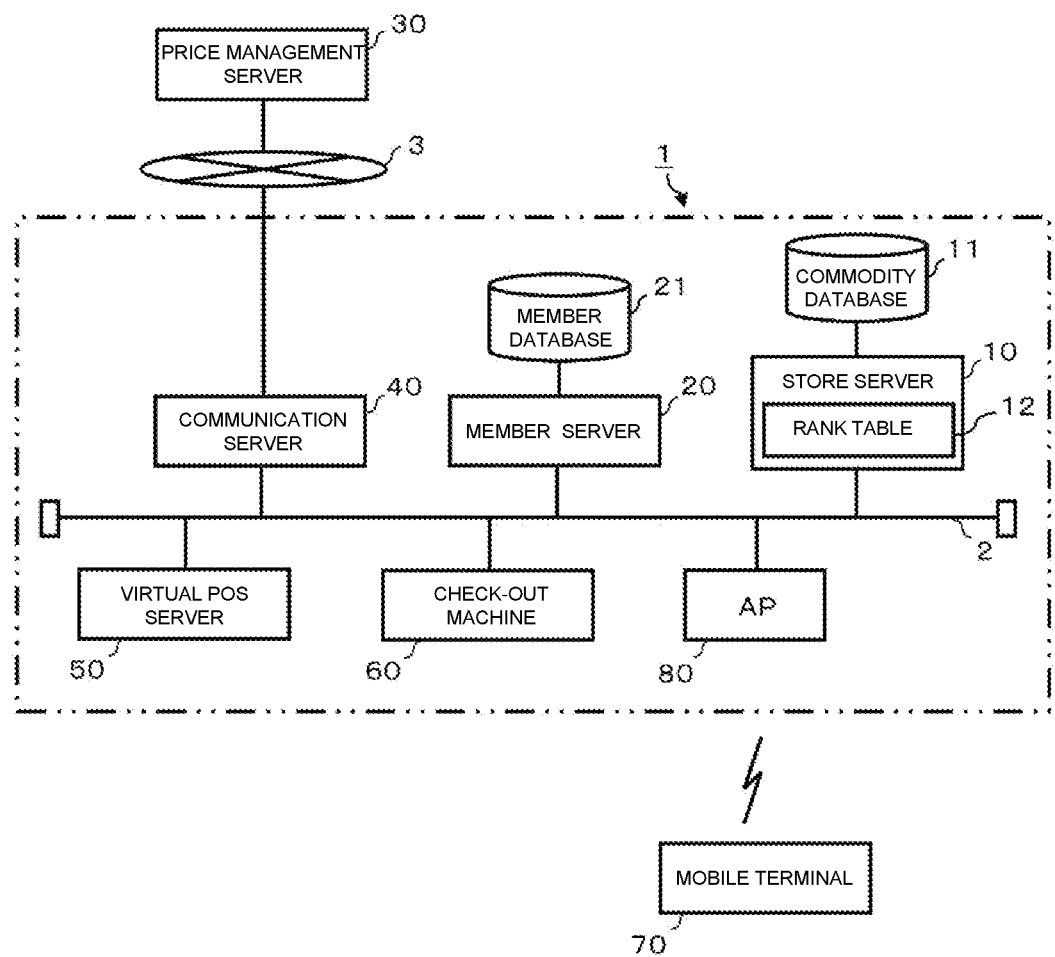
FIG. 1 is a diagram schematically showing a configuration of a store system according to an embodiment.

In accordance with one embodiment, an information processing apparatus ranks a user visiting an own store in accordance with a purchase amount of a commodity by the user. The information processing apparatus includes a communication interface, a storage device, and a processor. The communication interface communicates with a mobile terminal used by the user visiting the own store. The communication interface communicates with a management server that manages, for each of a plurality of users, a rank of the user and a cumulative purchase amount of the user, manages price information of the commodity sold at the own store, and manages a price of each commodity sold at a plurality of stores. The storage device stores the rank of the user and the cumulative purchase amount of the user. The processor acquires an information command from the mobile terminal of the user via the communication interface, the information command containing information about the user and information about a commodity that the user has selected for purchase, acquires the rank and the cumulative purchase amount of the user, who is authenticated on the basis of the information about the user contained in the information command, from the management server via the communication interface, and stores the acquired rank and the acquired cumulative purchase amount of the user in the storage device. The processor acquires the price of the commodity at the own store from the management server via the communication interface on the basis of the commodity information contained in the information command. The processor acquires the price of the commodity at the other store from the management server via the communication interface. In a case in which the price at the own store is higher than the price at the other store, the processor updates the cumulative purchase amount by adding an amount based on a difference between the prices at the own store and the other store to the cumulative purchase amount stored in the storage device. In addition, the processor updates the rank of the user stored in the storage device to a rank according to the updated cumulative purchase amount.

Hereinafter, the embodiment will be described with reference to the drawings. The same reference signs in the drawings will denote the same or similar portions. The embodiment is an example of a store system in which a user who is a purchaser uses a mobile terminal owned by the user to register by him or herself a commodity that the user will purchase on a selling area, i.e., a so-called commodity-to-be-purchased.

FIG. 1 is a schematic diagram showing a schematic configuration of a store system 1 according to the embodiment.

The store system 1 includes a store server 10, a member server 20, a communication server 40, a virtual point of sales (POS) server 50, a check-out machine 60, and an access point 80. The store server 10, the member server 20, the communication server 40, the virtual POS server 50, the check-out machine 60, and the access point 80 are connected to a network 2 such as a local area network (LAN). The communication server 40 is connected to a price management server 30 via a dedicated network 3. The communication server 40 performs data communication processing between the virtual POS server 50 or the check-out machine 60 and the price management server 30 via the dedicated network 3. The price management server 30 collects commodity data of commodities sold at a plurality of stores and collectively manages the commodity data. For example, the price management server 30 compares the prices of the same commodities of plurality of stores with one another to detect the lowest price or the minimum price. The access point 80 wirelessly communicates with a mobile terminal 70. The access point 80 relays communication between each device connected to the network 2, i.e., the store server 10, the member server 20, the communication server 40, the virtual POS server 50, or the check-out machine 60, and the mobile terminal 70. Although only one access point 80 is shown in FIG. 1, two or more access points 80 may be provided in a manner that depends on the store size or the like.

The mobile terminal 70 is a device that allows the user to input by him or herself data related to registration of the commodity-to-be-purchased. The mobile terminal 70 is a portable communication terminal. The mobile terminal 70 includes a wireless device 76 (see FIG. 2). The mobile terminal 70 has hardware for reading at least data codes such as barcodes and two-dimensional codes as will be described in detail later. For example, a smartphone, a tablet terminal, or the like equipped with a digital camera, which is privately owned by the user, can be used as the mobile terminal 70.

Figure 2:
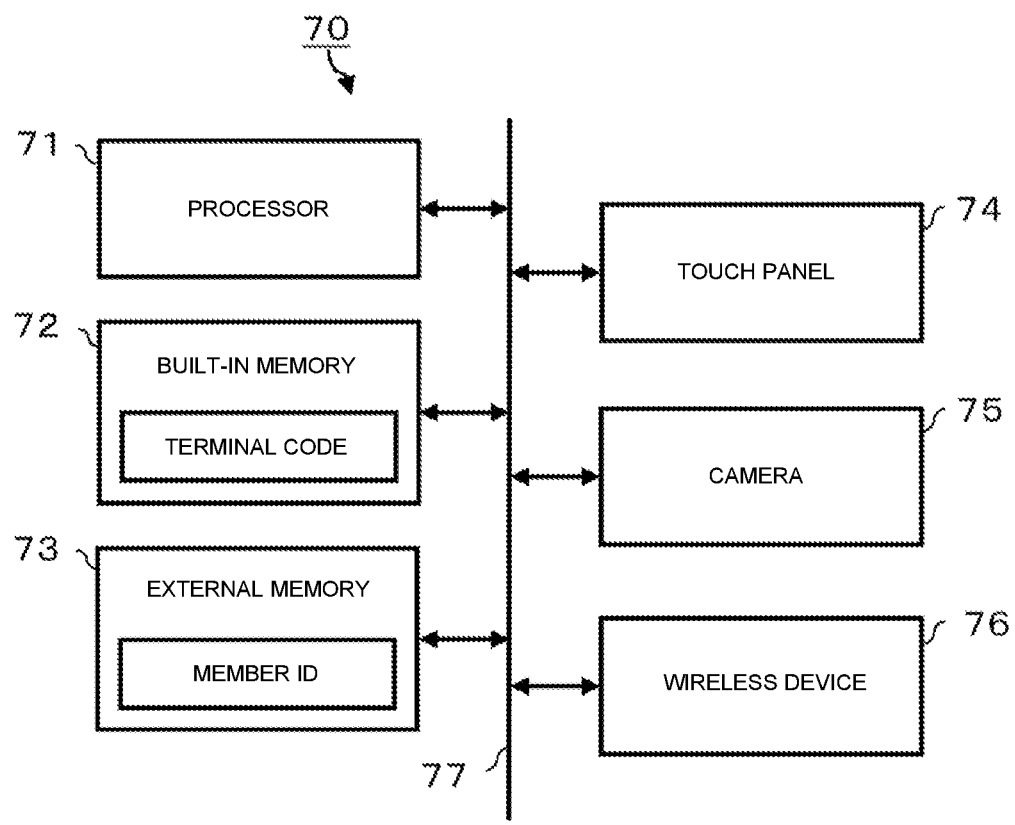
FIG. 2 is a block diagram showing a circuit configuration of a mobile terminal according to the embodiment.

FIG. 2 is a block diagram showing a circuit configuration of the mobile terminal 70. The mobile terminal 70 includes a processor 71, a built-in memory 72, an external memory 73, a touch panel 74, a camera 75, a wireless device 76, and a system transmission line 77. The system transmission line 77 includes an address bus, a data bus, a control signal line, and the like. In the mobile terminal 70, the processor 71, the built-in memory 72, the external memory 73, the touch panel 74, the camera 75, and the wireless device 76 are connected to the system transmission line 77. In the mobile terminal 70, a computer is configured by the processor 71, the built-in memory 72, and the external memory 73, and the system transmission line 77 that connects them.

The processor 71 corresponds to a central portion of the computer. The processor 71 controls each unit to achieve various functions as the mobile terminal 70 in accordance with an operating system or an application program. The processor 71 is, for example, a central processing unit (CPU).

The built-in memory 72 corresponds to a main storage portion of the computer. The built-in memory 72 includes a non-volatile memory area and a volatile memory area. The built-in memory 72 stores the operating system or the application program in the non-volatile memory area. The built-in memory 72 sometimes stores data necessary for the processor 71 to perform processing for controlling each unit in the non-volatile or volatile memory area. The volatile memory area of the built-in memory 72 is used as a work area in which data is rewritten as appropriate by the processor 71. The non-volatile memory area is, for example, a read only memory (ROM). The volatile memory area is, for example, a random access memory (RAM).

The external memory 73 corresponds to an auxiliary storage portion of the computer. For example, an electric erasable programmable read-only memory (EEPROM), a hard disc drive (HDD), a solid state drive (SSD), or the like can be used as the external memory 73. The external memory 73 stores data to be used by the processor 71 for performing various types of processing, data generated by processing at the processor 71, and the like. The external memory 73 sometimes stores the application program.

The application program stored in the built-in memory 72 or the external memory 73 includes a control program described with respect to information processing performed by the mobile terminal 70. The method of installing the control program in the built-in memory 72 or the external memory 73 is not particularly limited. The control program can be installed in the built-in memory 72 or the external memory 73 by being recorded on a removable recording medium or distributed by communication over a network. The recording medium can be in any form as long as it can store a program and can be read by an apparatus like a CD-ROM, a memory card, or the like.

The touch panel 74 is a device serving as both of an input device and a display device of the mobile terminal 70. The touch panel 74 detects a touch position with respect to a displayed image and outputs information about the touch position to the processor 71.

The camera 75 is an image pick-up device built in the mobile terminal 70. The camera 75 operates as an imaging device for a still image or moving image or as a scanning device for a data code such as a barcode and a two-dimensional code in accordance with the application program installed in the mobile terminal 70. The camera 75 is an example of a code reader.

The wireless device 76 performs wireless data communication with the access point 80 in accordance with a wireless communication protocol.

The mobile terminal 70 stores a terminal code in the non-volatile memory area of the built-in memory 72. The terminal code is terminal identification data set for each mobile terminal 70 in order to identify each mobile terminal 70. Moreover, the mobile terminal 70 stores a member ID in the external memory 73.

Now, the description of FIG. 1 will be continued. The store server 10 manages a commodity database 11 and a rank table 12 (see FIG. 3). The commodity database stores a commodity data record describing data on commodities sold at the store. The commodity data record includes items such as a commodity code, a commodity name, and a price. The commodity code is commodity identification data set for each commodity in order to identify each commodity. A barcode indicating the commodity code is typically attached to each commodity.

FIG. 3 is a diagram schematically showing an example of the rank table 12. As shown in FIG. 3, the rank table 12 is a data table including a rank and a cumulative purchase amount. The rank relates to classification of users preset by the store. The rank is, for example, one selected from "A" to "F". It is assumed that "A" is ranked higher than "F". Here, the user is given a reward set in advance by the store according to the height of the rank. That is, the store gives better rewards to higher-ranked users in order to motivate users to purchase and promote sales. The cumulative purchase amount is the total amount of commodities that the user has bought at the store up to the present time, so-called purchased commodities. When the cumulative purchase amount increases, a rank corresponding to the cumulative purchase amount is set to the user. It should be noted that the rank and the cumulative purchase amount are not limited to those shown in FIG. 3.

Now, the description of FIG. 1 will be continued. The member server 20 manages a member database 21. The member is a user who has installed a dedicated application program (hereinafter, referred to as shopping app) in the mobile terminal 70 and has been registered as a member in order to use the store system 1. The member database stores a member data record describing member data for each member. The member data record includes a member ID, a name, a gender, an e-mail address, a rank, a cumulative purchase amount, and the like. The member ID is a unique code assigned to each member in order to identify the member.

The virtual POS server 50 cooperates with the mobile terminal 70 to perform support for making a POS terminal look as if it is operating.

The check-out machine 60 is a device that allows a store clerk or a user to perform check-out for commodities to be purchased. The number of check-out machines 60 is not particularly limited.

Figure 4:
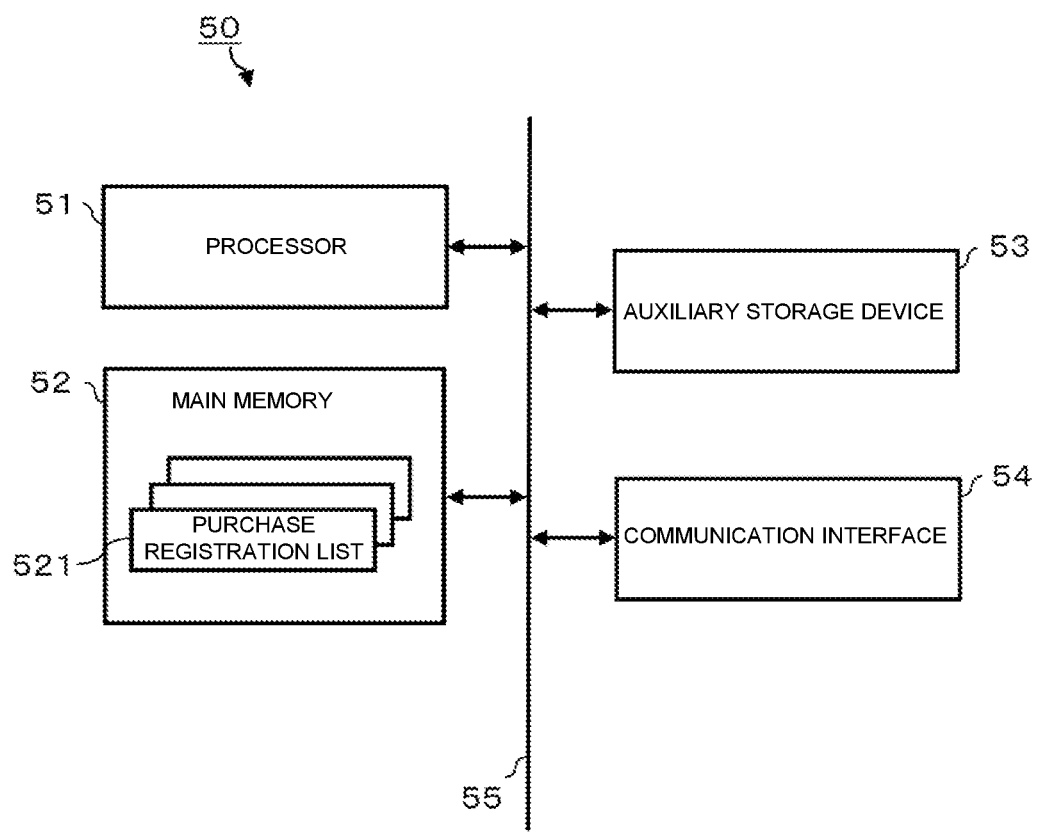
FIG. 4 is a block diagram showing a circuit configuration of a virtual POS server according to the embodiment.

FIG. 4 is a block diagram showing a circuit configuration of the virtual POS server 50. The virtual POS server 50 includes a processor 51, a main memory 52, an auxiliary storage device 53, a communication interface 54, and a system transmission line 55. The system transmission line 55 includes an address bus, a data bus, a control signal line, and the like. In the virtual POS server 50, the processor 51, the main memory 52, the auxiliary storage device 53, and the communication interface 54 are connected to the system transmission line 55. In the virtual POS server 50, a computer is configured by the processor 51, the main memory 52, and the auxiliary storage device 53, and the system transmission line 55 that connects them.

The processor 51 corresponds to a central portion of the computer. The processor 51 controls each unit to achieve various functions as the virtual POS server 50 in accordance with an operating system or an application program. The processor 51 is, for example, a CPU.

The main memory 52 corresponds to a main storage portion of the computer. The main memory 52 includes a non-volatile memory area and a volatile memory area. The main memory 52 stores the operating system or the application program in the non-volatile memory area. The main memory 52 sometimes stores data necessary for the processor 51 to perform processing for controlling each unit in the non-volatile or volatile memory area. The volatile memory area of the main memory 52 is used as a work area in which data is rewritten as appropriate by the processor 51. The non-volatile memory area is, for example, a ROM. The volatile memory area is, for example, a RAM.

The auxiliary storage device 53 corresponds to an auxiliary storage portion of the computer. For example, an EEPROM, an HDD, an SSD, or the like may be used as the auxiliary storage device 53. The auxiliary storage device 53 stores data to be used for the processor 51 to perform various types of processing, data generated in processing at the processor 51, and the like. The auxiliary storage device 53 sometimes stores the above-mentioned application program.

The communication interface 54 is connected to the network 2. The communication interface 54 performs data communication with another device connected via the network 2 in accordance with a communication protocol.

Figure 5:
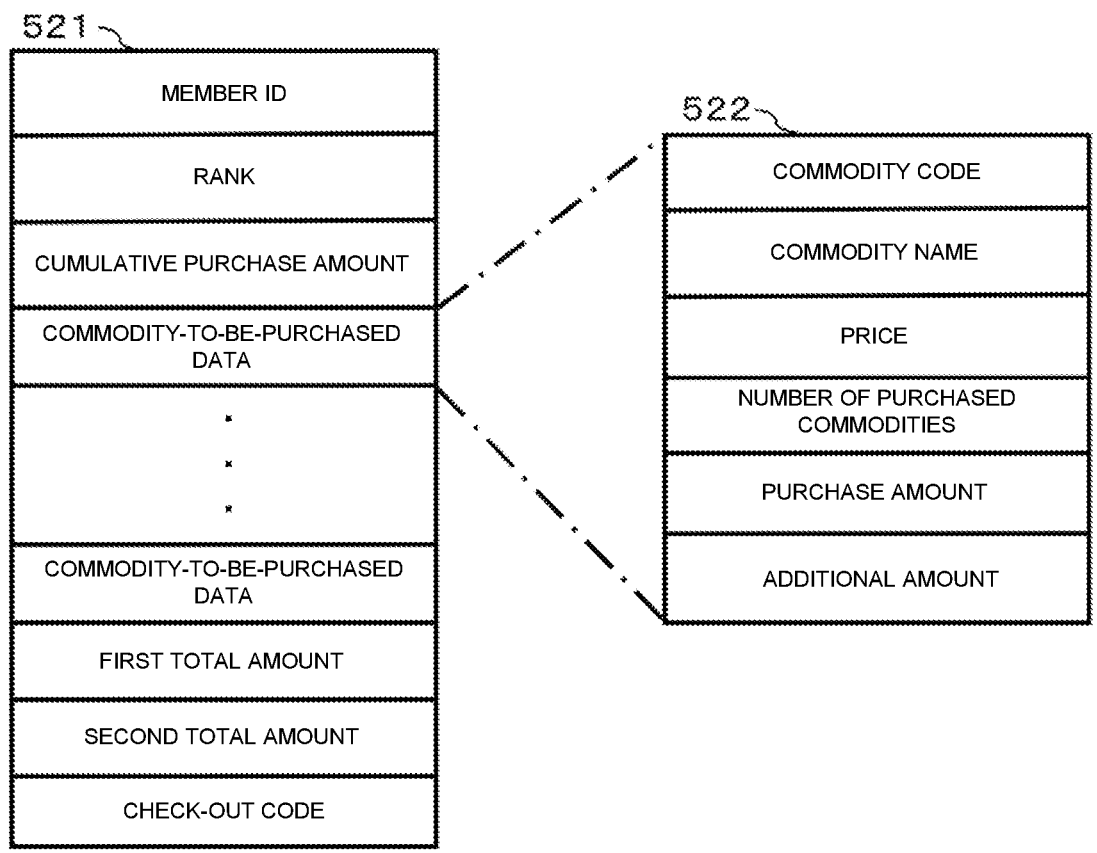
FIG. 5 is a diagram schematically showing an example of a purchase registration list according to the embodiment.

The virtual POS server 50 having such a configuration uses a part of the storage area of the auxiliary storage device 53 as a generation area for a purchase registration list 521 (see FIG. 5). The virtual POS server 50 is capable of generating a plurality of purchase registration lists 521 in this generation area.

FIG. 5 is a diagram schematically showing an example of the purchase registration list 521. As shown in FIG. 5, the purchase registration list 521 includes areas for storing a member ID, a rank, a cumulative purchase amount, commodity-to-be-purchased data 522, a first total amount, a second total amount, and a check-out code. The purchase registration list 521 is generated in association with the member ID of the mobile terminal 70. Then, the rank of the user identified by the member ID and the cumulative purchase amount at the present time are stored in the purchase registration list 521. Moreover, the data on the commodity that the user will purchase is stored in the purchase registration list 521 as the commodity-to-be-purchased data 522.

As shown in FIG. 5, the commodity-to-be-purchased data 522 includes a commodity code, a commodity name, a price, the number of purchased commodities, a purchase amount, an additional amount, and the like of the commodity-to-be-purchased that the user will purchase. The number of purchased commodities is the number of purchased commodities identified by the commodity code. The purchase amount is an amount obtained by multiplying the price by the number of purchased commodities. The additional amount will be described in later. In the purchase registration list 521, the first total amount is an amount obtained by summing up purchase amounts of the commodity-to-be-purchased data 522. The second total amount is an amount obtained by summing up additional amounts of the commodity-to-be-purchased data 522.

Figure 6:
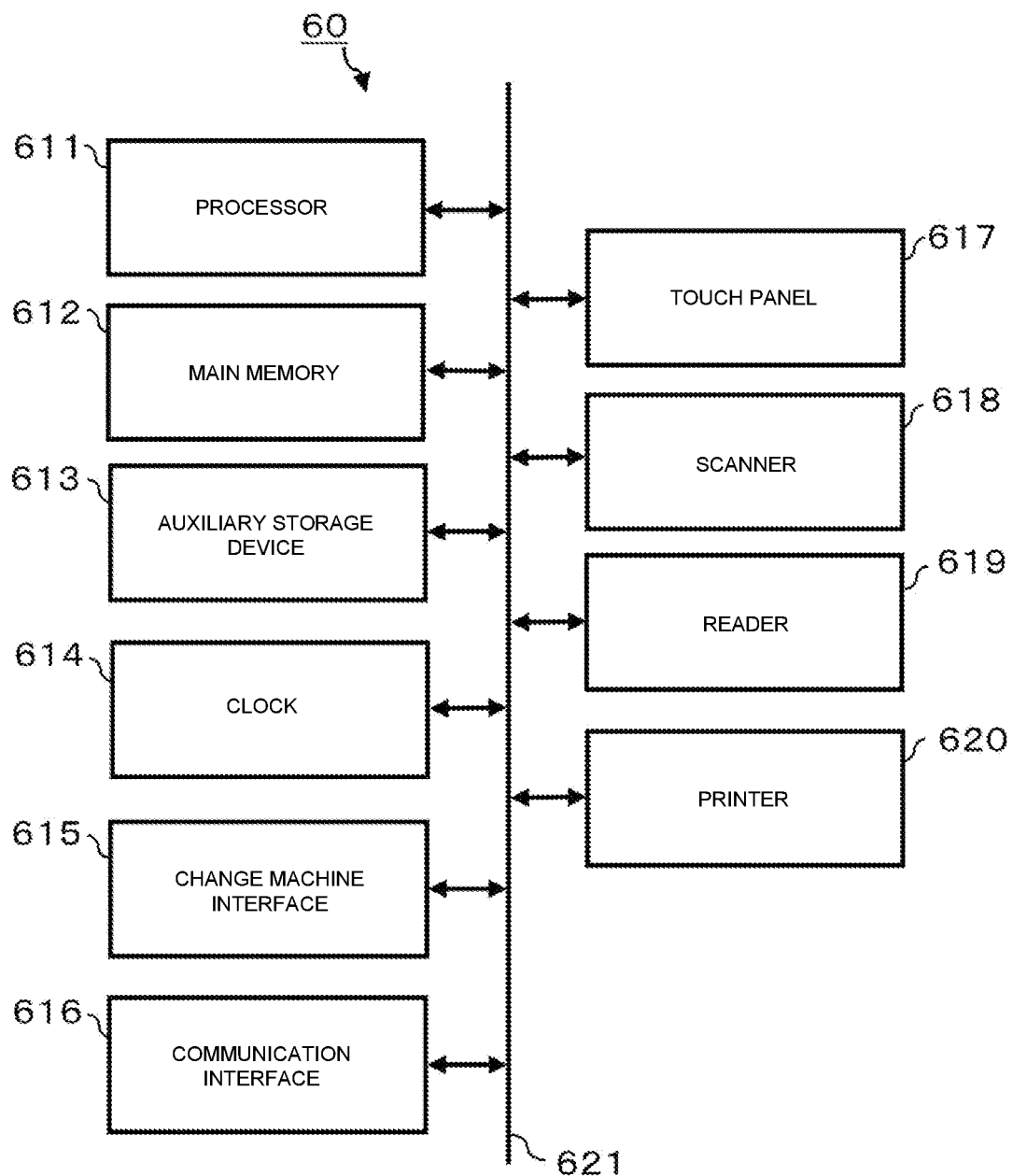
FIG. 6 is a block diagram showing a circuit configuration of a check-out machine according to the embodiment.

FIG. 6 is a block diagram showing a circuit configuration of the check-out machine 60. The check-out machine 60 includes a processor 611, a main memory 612, an auxiliary storage device 613, a clock 614, a change machine interface 615, a communication interface 616, a touch panel 617, a scanner 618, a reader 619, a printer 620, and a system transmission line 621. The system transmission line 621 includes an address bus, a data bus, a control signal line, and the like. The system transmission line 621 connects the processor 611, the main memory 612, the auxiliary storage device 613, the clock 614, the change machine interface 615, the communication interface 616, the touch panel 617, the scanner 618, the reader 619, and the printer 620 to one another. A computer of the check-out machine 60 is configured by connecting the processor 611, the main memory 612, and the auxiliary storage device 613 to one another via the system transmission line 621.

The processor 611 corresponds to a central portion of the computer. The processor 611 controls each unit to achieve various functions as the check-out machine 60 in accordance with an operating system or an application program. The processor 611 is, for example, a CPU.

The main memory 612 corresponds to a main storage portion of the computer. The main memory 612 includes a non-volatile memory area and a volatile memory area. The main memory 612 stores the operating system or the application program in the non-volatile memory area. The main memory 612 sometimes stores data necessary for the processor 611 to perform processing for controlling each unit in the non-volatile or volatile memory area. The volatile memory area of the main memory 612 is used as a work area in which data is rewritten as appropriate by the processor

611. The non-volatile memory area is, for example, a ROM. The volatile memory area is, for example, a RAM.

The auxiliary storage device 613 corresponds to an auxiliary storage portion of the computer. For example, an EEPROM, an HDD, an SSD, or the like may be used as the auxiliary storage device 613. The auxiliary storage device 613 stores data to be used for the processor 611 to perform various types of processing, data generated in processing at the processor 611, and the like. The auxiliary storage device 613 sometimes stores the above-mentioned application program.

The application program stored in the main memory 612 or the auxiliary storage device 613 includes a control program described with respect to information processing performed by the check-out machine 60. The method of installing the control program in the main memory 612 or the auxiliary storage device 613 is not particularly limited. The control program can be installed in the main memory 612 or the auxiliary storage device 613 by being recorded on a removable recording medium or distributed by communication over a network. The recording medium can be in any form as long as it can store a program and can be read by an apparatus like a CD-ROM, a memory card, or the like.

The clock 614 functions as a time information source of the check-out machine 60. The processor 611 counts the current date and time on the basis of information about the time counted by the clock 614.

The change machine interface 615 performs data communication with an automatic change machine. The change machine interface 615 receives, from the automatic change machine, data on the amount of input money, data on the number of stored coins and bills, and the like. The change machine interface 615 sends change data to the automatic change machine.

The communication interface 616 is connected to the network 2. The communication interface 616 performs data communication with another device connected via the network 2 in accordance with a communication protocol.

The touch panel 617 is a device serving as both of an input device and a display device of the check-out machine 60. The touch panel 617 detects a touch position with respect to a displayed image and outputs information about the touch position to the processor 611.

The scanner 618 is an example of a reader that reads a code symbol such as a barcode and a two-dimensional code. The scanner 618 may be of a type that reads a code symbol by scanning with a laser beam or may be of a type that reads a code symbol from an image picked up by an image pick-up device.

The reader 619 reads data recorded on the recording medium and outputs the read data to the processor 611. The reader 619 is a magnetic card reader in a case where the recording medium is a magnetic card and is an IC card reader in a case where the recording medium is a contact type IC card. With a recording medium using an RFID, such as a contactless IC card and a smartphone, an RFID reader is used as the reader 619.

The printer 620 issues a receipt by printing various character strings, images, and the like on a receipt sheet. A thermal printer, a dot impact printer, or the like, for example, can be used as this type of printer 620. The printer 620 functions as a printing device of the check-out machine 60.

Figure 7:
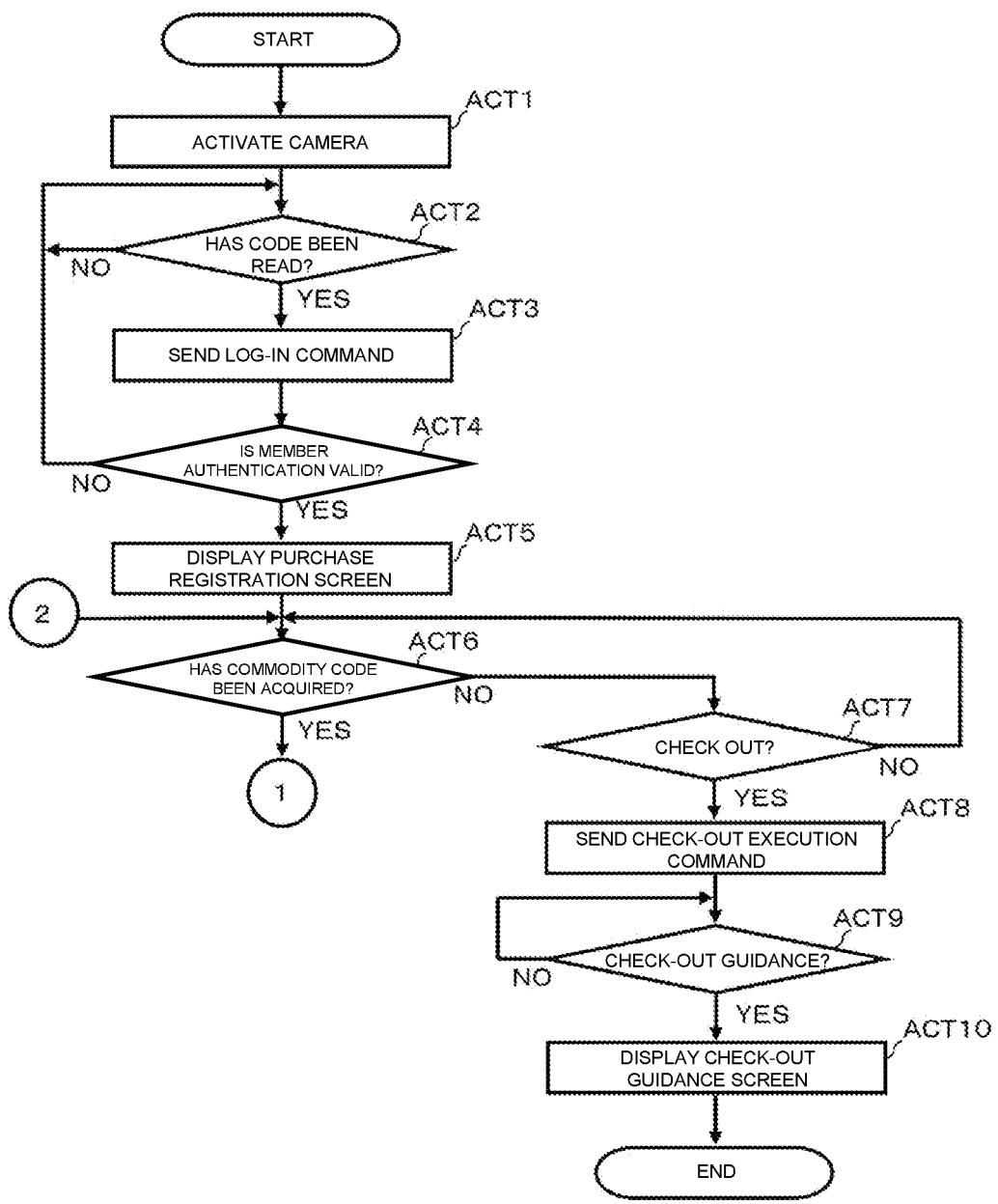
FIG. 7 is a flowchart showing information processing of a processor of the mobile terminal according to the embodiment.
Figure 8:
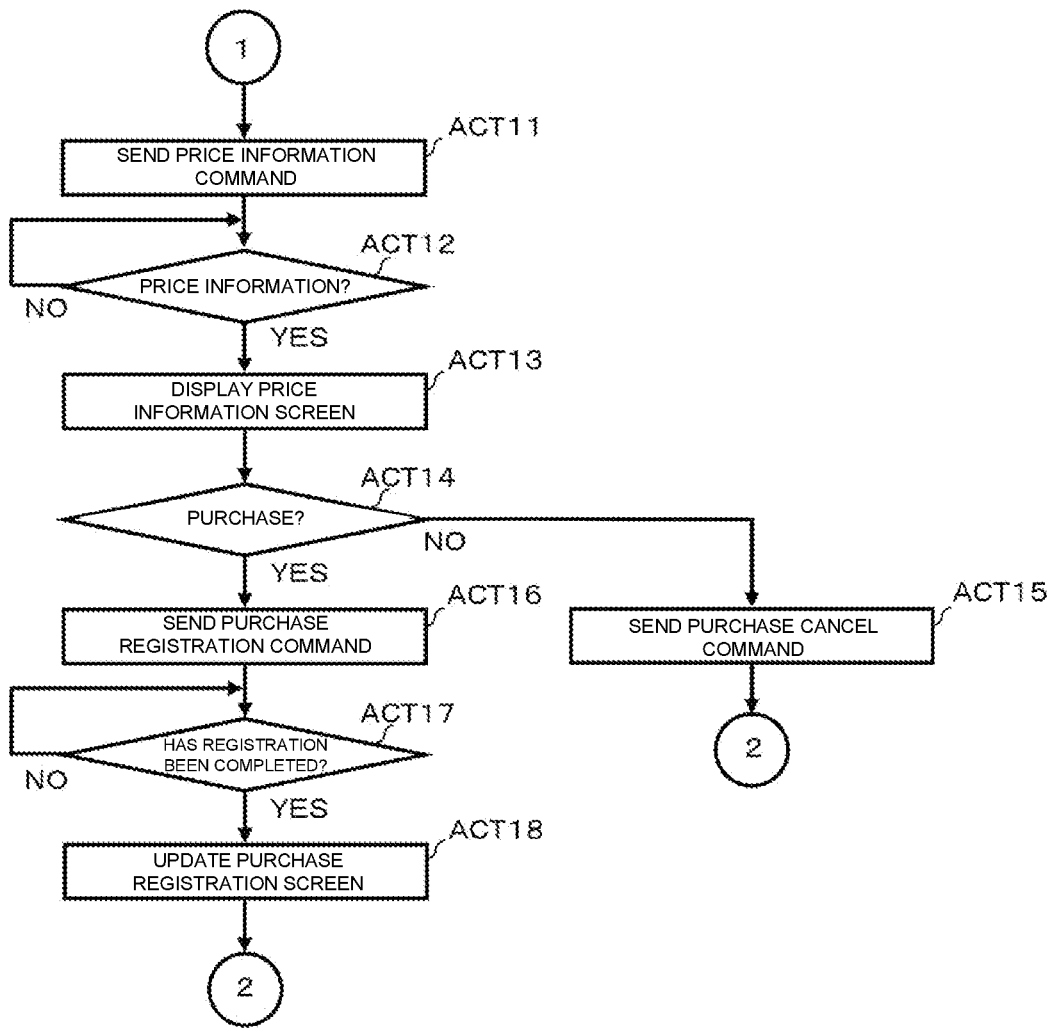
FIG. 8 is a flowchart showing information processing of the processor of the mobile terminal according to the embodiment.

FIGS. 7 and 8 are flowcharts showing information processing of the processor 71 in the mobile terminal 70. FIGS. 9 to 11 and 13 are flowcharts showing information processing of the processor 51 in the virtual POS server 50. FIG. 12 is a flowchart showing information processing by the processor 611 in the check-out machine 60.

Hereinafter, a main operation of the store system 1 will be described below with reference to those flowcharts. It should be noted that the operation to be described below is an example. In a case where similar results are obtained, the procedure is not particularly limited.

First, when the user visits a store to which the store system 1 has been introduced, the user starts a shopping app installed in the mobile terminal 70 before the user starts shopping. The processor 71 then starts the information processing shown in the flowchart of FIG. 7.

In ACT1 of FIG. 7, the processor 71 activates the camera 75. When the camera 75 is activated, the processor 71 causes the touch panel 74 to display a camera screen. It should be noted that an image showing a reading area of a data code of a two-dimensional code system is displayed on the camera screen. The user who has checked the camera screen makes the lens of the camera 75 facing a data code prepared by the store such that the data code appears in the image.

The processor 71 waits for the data code to be read by the camera 75 by determining whether or not the data code has been read in ACT2. In a case where the data code appears in the image, the processor 71 determines that the data code has been read. In a case where it is determined that the data code has been read (YES in ACT2), the processing of the processor 71 proceeds to ACT3.

In ACT3, the processor 71 controls the wireless device 76 to send a log-in command to the virtual POS server 50. By this control, the wireless device 76 wirelessly sends the log-in command. The log-in command is received at the access point 80 and is sent to the virtual POS server 50 over the network 2. The log-in command includes a member ID.

Figure 9:
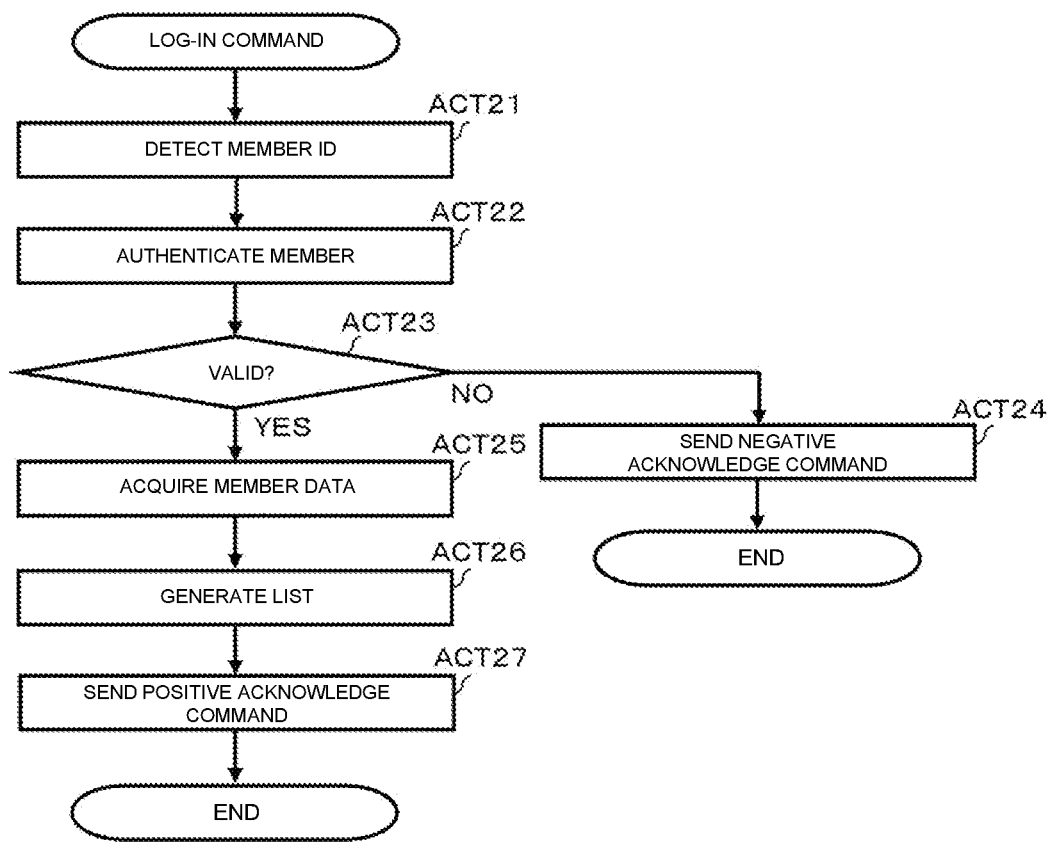
FIG. 9 is a flowchart showing information processing of a processor of the virtual POS server according to the embodiment.

The processor 51 of the virtual POS server 50 that has received the log-in command starts command reception processing shown in the flowchart of FIG. 9.

In ACT21 of FIG. 9, the processor 51 detects the member ID from the log-in command. In ACT22, the processor 51 then authenticates a member identified by the member ID. Specifically, the processor 51 inquires of the member server 20 whether or not a member data record including the member ID is present in the member database 21. As a result, when the processor 51 receives an acknowledge indicating that the corresponding member data record is present in the member database 21 from the member server 20, the processor 51 recognizes that the member authentication is valid. On the other hand, in a case where the acknowledge indicating that the corresponding member data record is not present in the member database 21 is received from the member server 20, the processor 51 recognizes that the member authentication is invalid.

In ACT23, the processor 51 determines whether the member authentication result is valid or invalid. Here, in a case where the authentication result is invalid (the processor 51 makes a "NO" determination in ACT23), the processing of the processor 51 proceeds to ACT24. In ACT24, the processor 51 controls the communication interface 54 to send a negative acknowledge command to the mobile terminal 70. By this control, the communication interface 54 sends the negative acknowledge command. The negative acknowledge command is wirelessly sent from the access point 80 via the network 2 and is received by the mobile terminal 70 that has sent the log-in command.

In a case where the authentication result is valid (YES in ACT23), the processing of the processor 51 proceeds to ACT25. In ACT25, the processor 51 requests member data of the member identified by the member ID from the member server 20 and acquires the member data including a member ID, a rank, and a cumulative purchase amount from the member server 20.

In ACT26, the processor 51 generates a purchase registration list 521 in the main memory 52. Then, the processor 51 writes the acquired member data (see ACT25) in the purchase registration list 521.

In ACT27, the processor 51 controls the communication interface 54 to send a positive acknowledge command to the mobile terminal 70. By this control, the communication interface 54 sends the positive acknowledge command. The positive acknowledge command is wirelessly sent from the access point 80 via the network 2 and is received by the mobile terminal 70 that has sent the log-in command.

As described above, the processor 51 of the virtual POS server 50 that has received the log-in command sends, in ACT24 or ACT27, the negative or positive acknowledge command to the mobile terminal 70 that has sent the log-in command. In a case where the processor 51 finishes sending either one acknowledge command, the processor 51 terminates the information processing shown in the flowchart of FIG. 9.

Now, the description of FIG. 7 will be continued. The processor 71 of the mobile terminal 70 that has controlled to send the log-in command in ACT3 waits for the acknowledge command by determining whether or not the acknowledge command has been received from the virtual POS server 50 in ACT4. In a case where a negative acknowledge command has been received from the virtual POS server 50 (NO in ACT4), the processing of the processor 71 returns to ACT2. Therefore, the processor 71 causes the touch panel 74 to display the camera screen and waits for the data code to be read by the camera 75 as described above.

Moreover, in a case where the positive acknowledge command has been received from the virtual POS server 50 (YES in ACT4), the processing of the processor 71 proceeds to ACT5. In ACT6, the processor 71 causes the touch panel 74 to display a purchase registration screen 100 (see FIG. 14).

Figure 14:
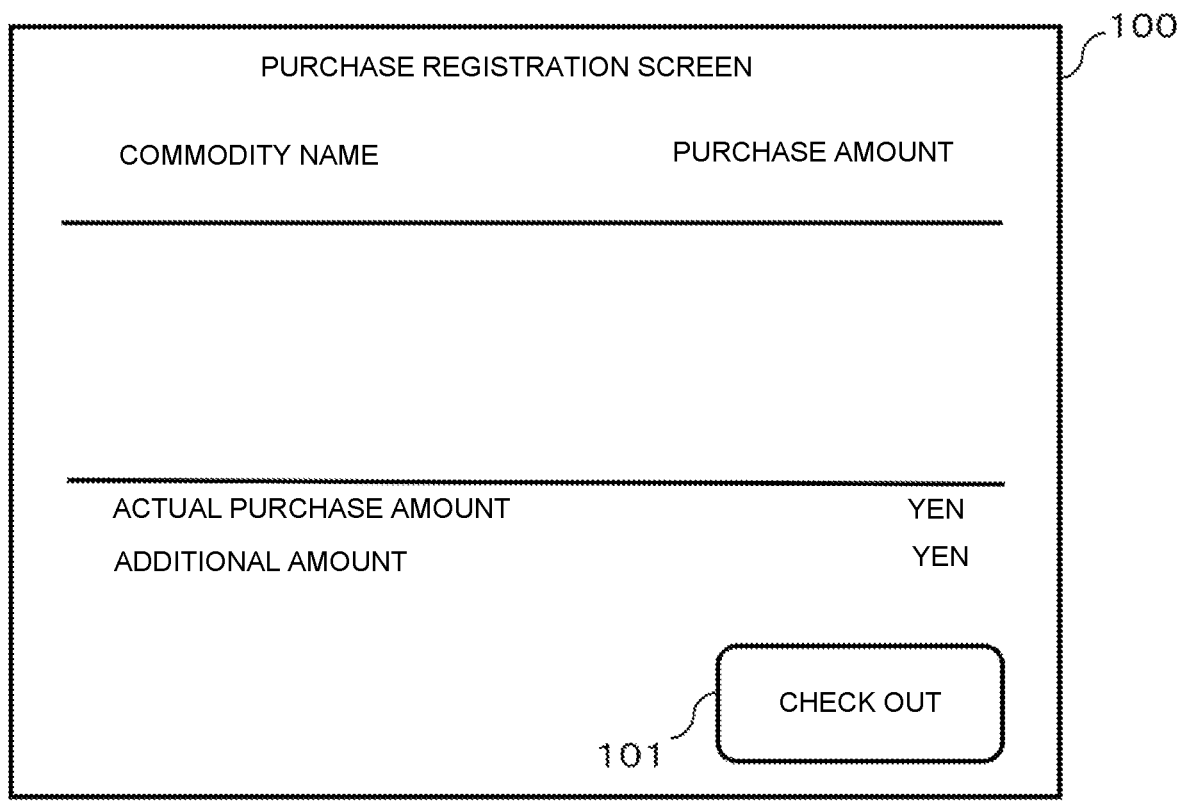
FIG. 14 is a diagram schematically showing an example of a purchase registration screen displayed by the mobile terminal according to the embodiment.

FIG. 14 is a diagram schematically showing an example of the purchase registration screen 100 displayed on the mobile terminal 70. As shown in FIG. 14, areas for displaying a commodity name, a purchase amount, an actual purchase amount, and an additional amount of the commodity registered for purchase are formed on the purchase registration screen 100. The actual purchase amount is the first total amount in the purchase registration list 521. The additional amount is the second total amount in the purchase registration list 521. Moreover, an image of a check-out button 101 for instructing check-out is displayed.

The user who has checked the purchase registration screen 100 goes around the selling area and puts commodities to be purchased in a shopping basket. The user operates the camera 75 to read the barcode attached to each of the commodities to be purchased before the user puts the commodity in the shopping basket. When the barcode is read by the camera 75, the commodity code represented by the barcode is input to the mobile terminal 70.

It should be noted that code symbols are not attached to some commodities such as fresh foods. Although not shown in the figure, in a case where the code symbol is not attached to the commodity-to-be-purchased, the user touches a commodity button of commodity buttons displayed on the screen of the touch panel 74, which corresponds to the commodity-to-be-purchased. When the commodity button is touched, the commodity code of the commodity corresponding to the commodity button is input to the mobile terminal 70. That is, the commodity identified by the commodity code is registered. It should be noted that as another means, for example, code symbols such as barcodes and two-dimensional codes may be provided near price tags placed around commodities such as vegetables and fruits and those code symbols may be read by the camera 75.

Now, the description of FIG. 7 will be continued. When the processor 71 finishes the processing of ACT5, the processor 71 determines whether or not the commodity code has been acquired in ACT6. In a case where it is determined that the commodity code has been acquired (YES in ACT6), the processing of the processor 71 proceeds to ACT11 of FIG. 8. In ACT11, the processor 71 controls the wireless device 76 to send a price information command to the virtual POS server 50. By this control, the wireless device 76 wirelessly sends the price information command. The price information command is received at the access point 80 and is sent to the virtual POS server 50 over the network 2. The price information command includes the member ID stored in the external memory 73 and the commodity code of the commodity-to-be-purchased.

Figure 10:
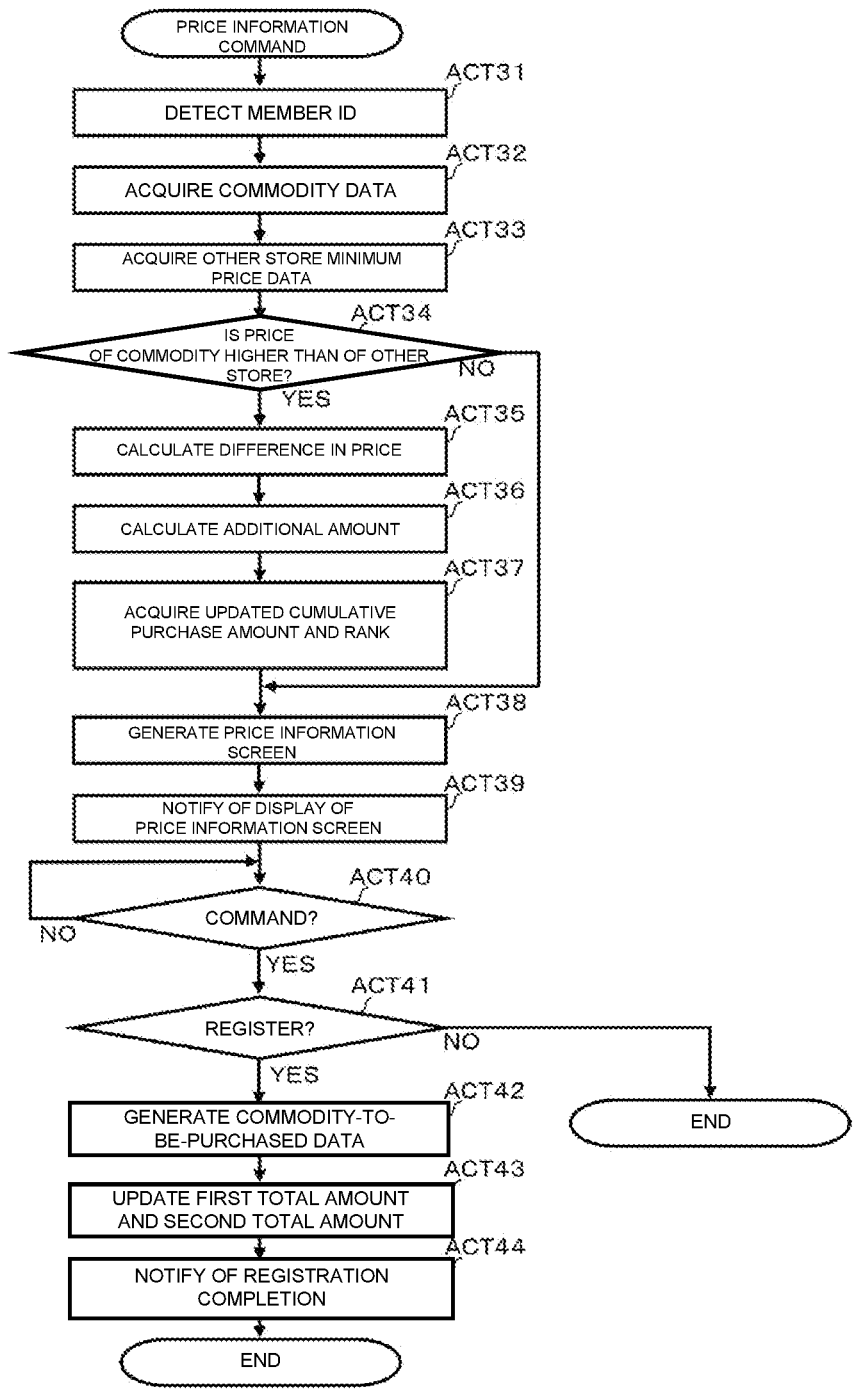
FIG. 10 is a flowchart showing information processing of the processor of the virtual POS server according to the embodiment.

The processor 51 of the virtual POS server 50 that has received the price information command starts command reception processing shown in the flowchart of FIG. 10. In ACT31 of FIG. 10, the processor 51 detects the member ID from the price information command.

In ACT32, the processor 51 acquires the commodity data. That is, the processor 51 detects the commodity code from the price information command and inquires of the store server 10 the commodity data identified by the commodity code. By this inquiry, the commodity data managed in the commodity database 11 is sent back from the store server 10, and thus the processor 51 acquires the commodity data.

In ACT33, the processor 51 acquires other store minimum price data. That is, the processor 51 detects the commodity code from the price information command and inquires of the price management server 30 the other store minimum price data identified by the commodity code. By this inquiry, the minimum price data obtained by comparing the commodity prices of the plurality of stores with one another is sent back from the price management server 30, and thus the processor 51 acquires the other store minimum price data.

In ACT34, the processor 51 compares the price of the commodity-to-be-purchased with the minimum price of the other store. Then, the processor 51 determines whether or not the price of the commodity-to-be-purchased is higher than the minimum price of the other store.

In a case where the price of the commodity-to-be-purchased is equal to or lower than the minimum price of the other store (NO in ACT34), the processing of the processor proceeds to ACT38. The processing of ACT38 will be described later.

Moreover, in a case where the price of the commodity-to-be-purchased is higher than the minimum price of the other store (YES in ACT34), the processing of the processor proceeds to ACT35.

In ACT35, the processor 51 calculates a difference in price. The difference in price is an amount obtained by subtracting the minimum price of other store from the price of the commodity-to-be-purchased. In ACT36, the processor 51 calculates an additional amount based on the difference in price. The additional amount is an amount calculated by multiplying the difference in price by a predetermined coefficient, for example, 100. The additional amount is added to the cumulative purchase amount according to the rank. That is, in the embodiment, in a case where the price of the commodity-to-be-purchased is higher than the minimum price of the other store, the additional amount based on the difference in price is added to the cumulative purchase amount.

In ACT37, the processor 51 acquires updated cumulative purchase amount (provisional cumulative purchase amount) and rank. That is, the processor 51 acquires the cumulative purchase amount, the first total amount, and the second total amount from the purchase registration list 521 including the member ID acquired in ACT31. The processor 51 calculates a third total amount obtained by adding the purchase amount of the commodity-to-be-purchased to the first total amount and a fourth total amount obtained by adding the additional amount to the second total amount. Then, the processor 51 adds the third total amount and the fourth total amount to the cumulative purchase amount, and calculates a cumulative purchase amount updated if the commodity-to-be-purchased is brought, i.e., an updated cumulative purchase amount (provisional cumulative purchase amount). The processor 51 inquires of the store server 10 the rank corresponding to the updated cumulative purchase amount (provisional cumulative purchase amount). By this inquiry, the store server 10 extracts the rank based on the rank table 12 and sends the extracted rank back to the virtual POS server 50. Thus, the processor 51 acquires the updated cumulative purchase amount (provisional cumulative purchase amount) and the rank.

When the processor 51 finishes the processing of ACT37, the processing of the processor 51 proceeds to ACT38. As described above, in a case where the price of the commodity-to-be-purchased is higher than the minimum price of the other store, the processing of the processor 51 proceeds to ACT38 through the processing of ACT35 to ACT37. The processor 51, in a case where the price of the commodity-to-be-purchased is equal to or lower than the minimum price of the other store, the processing of processor 51 skips the processing of ACT35 or ACT37 and proceeds to ACT38. In ACT38, the processor 51 generates a price information screen 200 (see FIG. 15), not a price information screen 204 (see FIG. 16).

Figure 15:
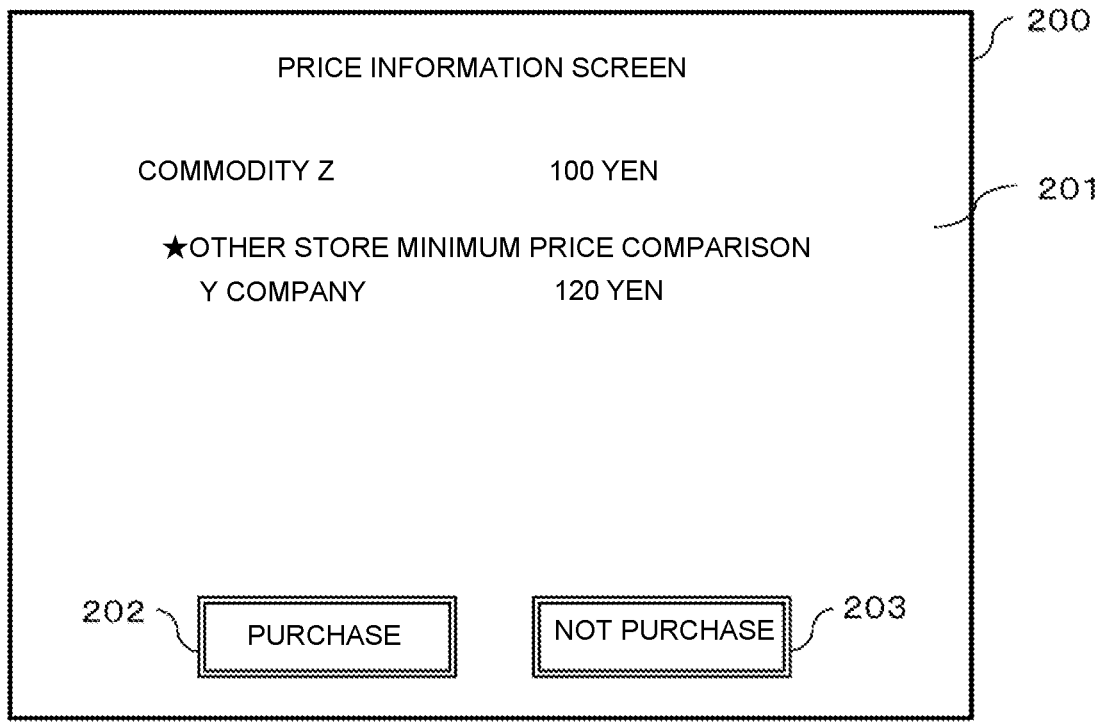
FIG. 15 is a diagram schematically showing an example of a price information screen in a case where a price of a commodity-to-be-purchased is equal to or lower than a minimum price of another store, the price information screen being displayed by the mobile terminal according to the embodiment.

FIG. 15 is a diagram schematically showing an example of the price information screen 200 in a case where the price of the commodity-to-be-purchased is equal to or lower than the minimum price of the other store. As shown in FIG. 15, the price information screen 200 displays a price information area 201 and images of a "Purchase" button 202 and a "Not Purchase" button 203. The price information area 201 is an area for displaying the commodity name and price of the commodity-to-be-purchased and the other store minimum price data, the other store minimum price data including the other store name and the minimum price. The user who checks the price information screen 200 and attempts to purchase the commodity-to-be-purchased touches the "Purchase" button 202. The user who does not attempt to purchase the commodity-to-be-purchased touches the "Not Purchase" button 203. It should be noted that the contents and images of the text data displayed in FIG. 15 are examples.

Figure 16:
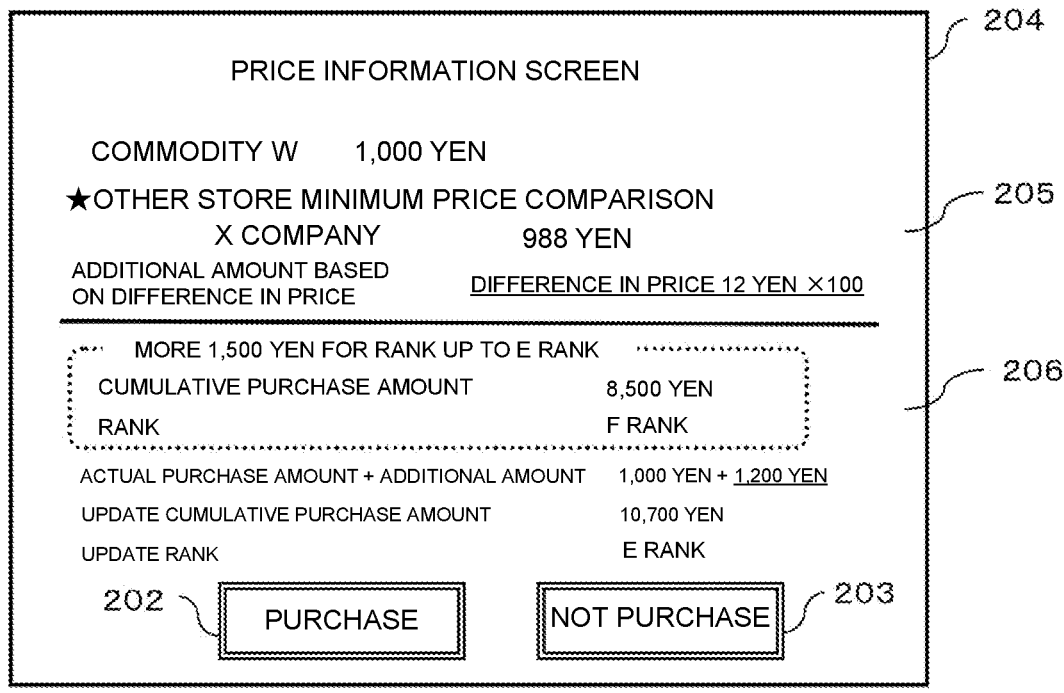
FIG. 16 is a diagram schematically showing an example of a price information screen in a case where the price of the commodity-to-be-purchased is higher than the minimum price of the other store, the price information screen being displayed by the mobile terminal according to the embodiment.

FIG. 16 is a diagram schematically showing an example of the price information screen 204 in a case where the price of the commodity-to-be-purchased is higher than the minimum price of the other store. As shown in FIG. 16, the price information screen 204 displays images of a price information area 205, a user information area 206, the "Purchase" button 202, and the "Not Purchase" button 203. In a case where the price of the commodity-to-be-purchased is higher, the additional amount based on the difference in price is also displayed in the price information area 205. The user information area 206 is an area for displaying the cumulative purchase amount and the rank up to the present time, the actual purchase amount and the additional amount, and the updated cumulative purchase amount (provisional cumulative purchase amount) and the rank. The user who checks the price information screen 204 and attempts to purchase the commodity-to-be-purchased touches the "Purchase" button 202. The user who does not attempt to purchase the commodity-to-be-purchased touches the "Not Purchase" button 203. It should be noted that the contents and images of the text data displayed in FIG. 16 are examples.

Now, the description of FIG. 10 will be continued. In ACT39, the processor 51 controls the communication interface 54 to display the price information screen 200 or the price information screen 204 on the mobile terminal 70. By this control, an information display notification command for notifying of the display of the price information screen 200 or the price information screen 204 is sent via the communication interface 54. The information display notification command is wirelessly sent from the access point 80 via the network 2 and is received by the mobile terminal 70 that has sent the price information command.

Now, the description of FIG. 8 will be continued. The processor 71 of the mobile terminal 70 that has controlled to send the price information command in ACT11 waits for the information display notification command by determining whether or not the information display notification command has been received from the virtual POS server 50 in ACT12. In a case where the information display notification command has been received from the virtual POS server 50 (YES in ACT12), the processing of the processor 51 proceeds to ACT13. In ACT13, the processor 71 causes the touch panel 74 to display the price information screen 200 or the price information screen 204.

The processor 71 waits for the "Purchase" button 202 or the "Not Purchase" button 203 to be touched by determining whether the "Purchase" button 202 or the "Not Purchase" button 203 on the price information screen 200 or the price information screen 204 has been touched in ACT14. In a case where the "Not Purchase" button 203 has been touched (NO in ACT14), the processing of the processor 71 proceeds to ACT15. In ACT15, the processor 71 controls the wireless device 76 to send a purchase cancel command to the virtual POS server 50. By this control, the wireless device 76 wirelessly sends the purchase cancel command. The purchase cancel command is received at the access point 80 and is sent to the virtual POS server 50 over the network 2. The purchase cancel command includes the member ID stored in the external memory 73. After controlling to send the purchase cancel command, the processing of the processor 71 returns to ACT6 of FIG. 7. On the other hand, in a case where the "Purchase" button 202 has been touched (YES in ACT14), the processing of the processor 71 proceeds to ACT16.

In ACT16, the processor 71 controls the wireless device 76 to send a purchase registration command to the virtual POS server 50. By this control, the wireless device 76 wirelessly sends the purchase registration command. The purchase registration command is received at the access point 80 and is sent to the virtual POS server 50 over the network 2. The purchase registration command includes the member ID stored in the external memory 73 and the commodity code of the commodity-to-be-purchased.

Now, the description of FIG. 10 will be continued. The processor 51 that has controlled to display the price information screen waits for the command from the mobile terminal 70 by determining whether or not the command has been received from the mobile terminal 70 in ACT40. In a case where the command has been received from the mobile terminal 70 in this standby state (YES in ACT40), the processing of the processor 51 proceeds to ACT41. In ACT41, the processor 51 determines whether the purchase registration command has been received or the purchase cancel command has been received. In a case where the purchase cancel command has been received (NO in ACT41), the processor 51 terminates the command reception processing shown in the flowchart of FIG. 10. Moreover, in a case where the purchase registration command has been received (YES in ACT41), the processing of the processor 51 proceeds to ACT42.

In ACT42, the processor 51 generates commodity-to-be-purchased data 522. That is, the processor 51 generates the commodity-to-be-purchased data 522 on the basis of the commodity code of the commodity-to-be-purchased, the commodity name and price designated by the commodity code, the number of purchased commodities and the purchase amount, and the additional amount. In a case where the price of the commodity-to-be-purchased is higher than the minimum price of the other store, the additional amount is the amount calculated by the processing of ACT36. The additional amount is 0 yen in a case where the price of the commodity-to-be-purchased is equal to or lower than the minimum price of the other store.

In ACT43, the processor 51 updates the first total amount and the second total amount. That is, the processor 51 adds the purchase amount of the commodity registered for purchase to the first total amount. Moreover, the processor 51 adds the additional amount to the second total amount.

In ACT44, the processor 51 controls the communication interface 54 to send a registration completion notification command to the mobile terminal 70. By this control, the registration completion notification command is sent via the communication interface 54. The registration completion notification command is wirelessly sent from the access point 80 via the network 2 and is received by the mobile terminal 70 that has sent the purchase registration command. Thus, the processor 51 terminates the information processing shown in the flowchart of FIG. 10.

Now, the description of FIG. 8 will be continued. After controlling to send the purchase registration command (see ACT16), the processor 71 of the mobile terminal 70 waits for the registration completion notification command by determining whether or not the registration completion notification command has been received from the virtual POS server 50 in ACT17. In a case where the registration completion notification command has been received from the virtual POS server 50 (YES in ACT17), the processing of the processor 71 proceeds to ACT18.

In ACT18, the processor 71 updates the purchase registration screen 100. That is, the processor 71 updates the purchase registration screen 100 such that the commodity name and the purchase amount of the commodity registered for purchase are added and that the actual purchase amount is changed to the first total amount and the additional amount is changed to the second total amount. The processing of the processor 71 that has updated the purchase registration screen 100 returns to ACT6 of FIG. 7. In a case where the processor 71 confirms that the commodity code has been obtained again in the standby state of ACT6, the processor 71 performs the processing of ACT11 to ACT18 of FIG. 8 in a manner similar to that described above. Therefore, also in the virtual POS server 50, the processor 51 performs the price information command reception processing shown in FIG. 10 again.

Moreover, in a case where the commodity code has not been acquired (NO in ACT6), the processing of the processor 71 proceeds to ACT7. In ACT7, the processor 71 determines whether or not an instruction to check out has been made.

As shown in FIG. 14, an image of the check-out button 101 is displayed on a part of the purchase registration screen 100. The user who has finished the purchase touches the check-out button 101. The processor 71 recognizes that the instruction to check out has been made in a case where the check-out button 101 has been touched. In a case where the instruction to check out has not been made (NO in ACT7), the processing of processor 71 returns to ACT6.

Moreover, in a case where the instruction to check out has been made (YES in ACT7), the processing of the processor 71 proceeds to ACT8.

In ACT8, the processor 71 controls the wireless device 76 to send a check-out execution command to the virtual POS server 50. By this control, the wireless device 76 wirelessly sends the check-out execution command. The check-out execution command is received at the access point 80 and is sent to the virtual POS server 50 over the network 2. The check-out execution command includes the member ID stored in the external memory 73.

Figure 11:
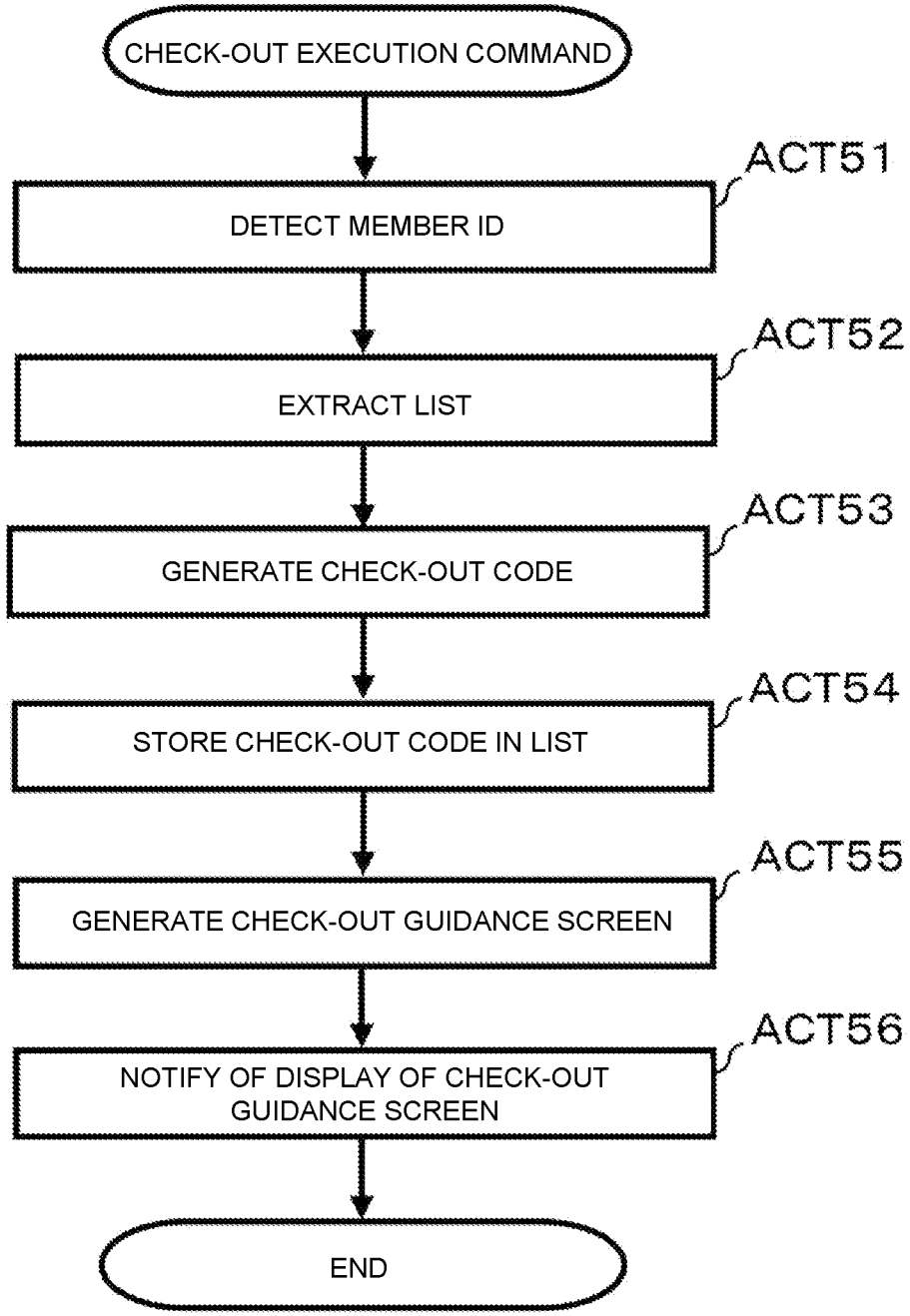
FIG. 11 is a flowchart showing information processing of the processor of the virtual POS server according to the embodiment.
Figure 12:
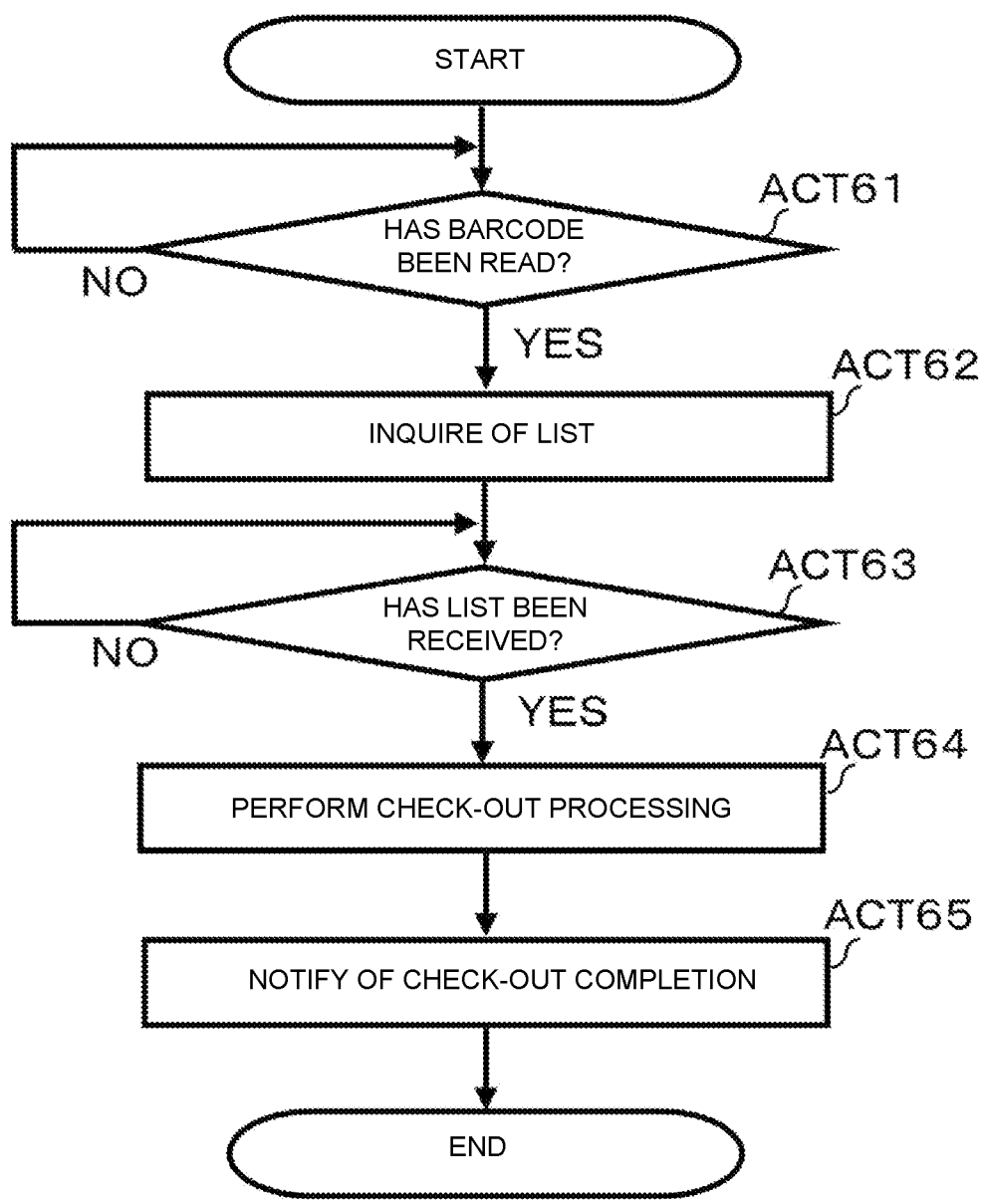
FIG. 12 is a flowchart showing information processing of a processor of the check-out machine according to the embodiment.

The processor 51 of the virtual POS server 50 that has received the check-out execution command starts the check-out execution command reception processing shown in the flowchart of FIG. 11. In ACT51 of FIG. 11, the processor 51 detects the member ID from the check-out execution command. In ACT52, the processor 51 extracts the purchase registration list 521 on the basis of the member ID.

In ACT53, the processor 51 generates data on a check-out code. The check-out code is used for identifying the user who performs check-out with the check-out machine 60. The check-out code is generated for each user who performs check-out with the check-out machine 60.

In ACT54, the processor 51 stores the check-out code in the purchase registration list 521. In ACT55, the processor generates a check-out guidance screen. The check-out guidance screen displays the image data indicating the check-out code generated in ACT53, i.e., the check-out barcode.

In ACT56, the processor 51 controls the communication interface 54 such that the check-out guidance screen is displayed on the mobile terminal 70. By this control, a screen display notification command for notifying of the display of the check-out guidance screen via the communication interface 54 is sent. The screen display notification command is wirelessly sent from the access point 80 via the network 2 and received by the mobile terminal 70 that has sent the check-out execution command. The screen display notification command includes a check-out barcode. Thus, the processor 51 terminates the information processing (check-out execution command reception processing) shown in the flowchart of FIG. 11.

Now, the description of FIG. 7 will be continued. After controlling to send the check-out execution command (see ACT8), the processor 71 of the mobile terminal 70 determines whether or not the screen display notification command has been received from the virtual POS server 50, i.e., whether or not to perform check-out guidance in ACT9. In a case where the screen display notification command has been received (YES in ACT9), i.e., in a case where the check-out guidance is to be performed, the processing of the processor 71 proceeds to ACT10. In ACT10, the processor 71 causes the touch panel 74 to display the check-out guidance screen. The check-out barcode is displayed on the check-out guidance screen. Thus, the processor 71 terminates the information processing of the procedure shown in the flowchart of FIG. 7.

The user who has checked the check-out guidance screen goes to a check-out area and causes the scanner 618 of the check-out machine 60 to read the check-out barcode displayed on the check-out guidance screen.

In ACT61 of FIG. 12, the processor 611 of the check-out machine 60 determines whether or not the check-out barcode has been read. In a case where the check-out barcode has been read (YES in ACT61), the processing of processor 611 proceeds to ACT62.

In ACT62, the processor 611 inquires of the virtual POS server 50 the purchase registration list 521 identified by the check-out barcode. By this inquiry, the virtual POS server 50 extracts the purchase registration list 521 and sends the extracted purchase registration list 521 back to the check-out machine 60.

In ACT63, the processor 611 waits for the data on the purchase registration list 521 by determining whether or not the data on the purchase registration list 521 has been received. In a case where the data on the purchase registration list 521 has been received from the virtual POS server 50 (YES in ACT63), the processing of the processor 611 proceeds to ACT64. In ACT64, the processor 611 performs check-out on the basis of the received purchase registration list 521. This check-out processing is existing processing and well-known, and thus detailed description thereof will be omitted.

In ACT65, the processor 611 controls the communication interface 616 to send the check-out notification command to the virtual POS server 50. By this control, the check-out notification command is sent via the communication interface 616. The check-out notification command is wirelessly sent from the access point 80 via the network 2 and is received by the virtual POS server 50. The check-out completion notification command includes the member ID stored in the purchase registration list 521. Thus, the processor 611 terminates the information processing shown in the flowchart of FIG. 12.

Figure 13:
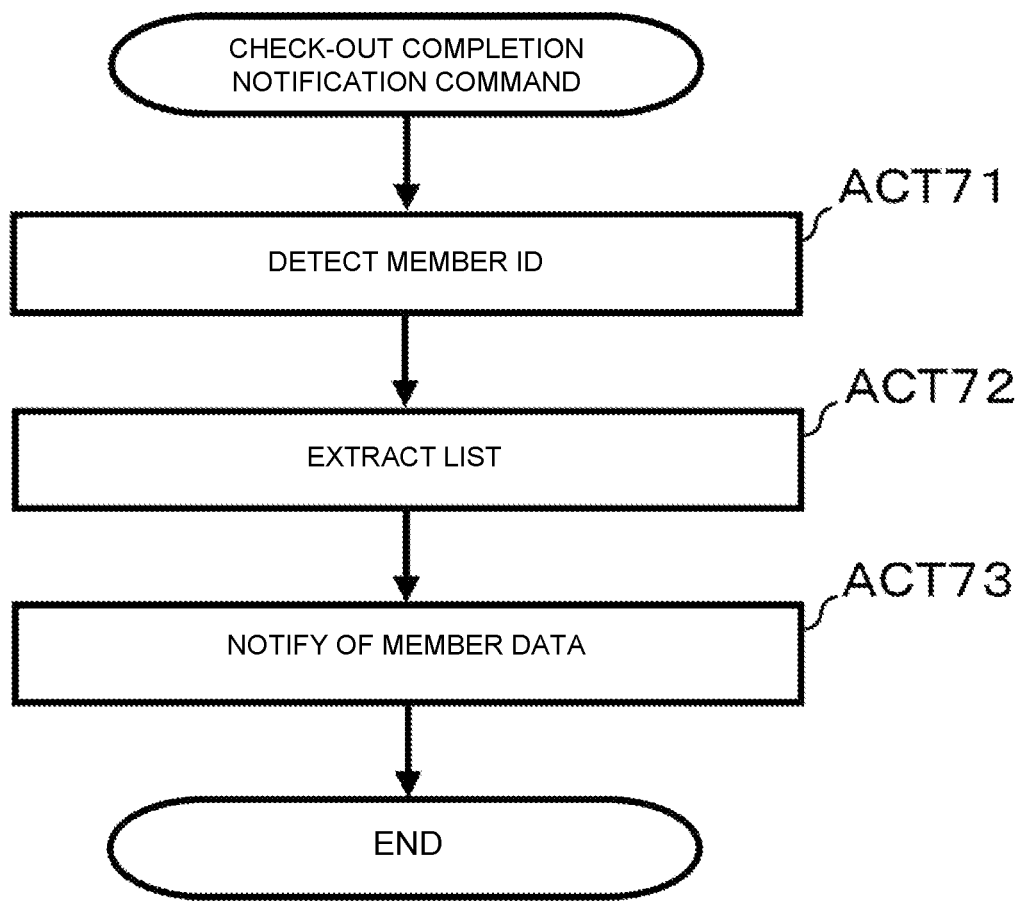
FIG. 13 is a flowchart showing information processing of the processor of the virtual POS server according to the embodiment.

The processor 51 of the virtual POS server 50 that has received the check-out notification command starts the check-out notification command reception processing shown in the flowchart of FIG. 13. In ACT71 of FIG. 13, the processor 51 detects the member ID from the check-out notification command. In ACT72, the processor 51 extracts the purchase registration list 521 on the basis of the member ID.

In ACT73, the processor 51 controls the communication interface 54 to send a member data notification command to the member server 20. By this control, the member data notification command is sent via the communication interface 54. The member data notification command is received by the member server 20 via the network 2. The member data notification command includes the member ID, the first total amount, and the second total amount which are stored in the purchase registration list 521. Thus, the processor 51 terminates the information processing (check-out completion notification command reception processing) of the procedure shown in the flowchart of FIG. 13.

It should be noted that the member server 20 that has received the member data notification command adds the first total amount and the second total amount to the cumulative purchase amount managed in association with the member ID in the member database 21. Then, the member server 20 inquires of the store server 10 a rank according to the cumulative purchase amount to which the first total amount and the second total amount have been added. By this inquiry, the store server 10 extracts the rank on the basis of the rank table 12 and sends the extracted rank back to the member server 20. The member server 20 updates the rank of the member database 21 determined with the member ID to the rank sent back from the store server.

As it will be obvious from the above description, the virtual POS server 50 which is an example of an information processing apparatus configures a first acquisition unit by the processor 51 performing the processing of ACT21 to ACT25 of FIG. 9. That is, the virtual POS server 50 acquires the rank of the visiting user and the amount according to the ranking.

The virtual POS server 50 configures a second acquisition means by the processor 51 performing the processing of ACT32 of FIG. 10. That is, the virtual POS server 50 acquires the price of the commodity that the user will purchase at its own store.

The virtual POS server 50 configures a third acquisition means by the processor 51 performing the processing of ACT33 of FIG. 10. That is, the virtual POS server 50 acquires the price of the commodity that the user will purchase at another store.

The virtual POS server 50 configures an addition means by the processor 51 performing the processing of ACT34 to ACT36 of FIG. 10. That is, the virtual POS server 50 adds the amount based on the difference in price to the amount according to the ranking acquired by the first acquisition means in a case where the price at the its own store is higher than the price at the other store.

In this manner, in accordance with this embodiment, the additional amount based on the difference in price is added to the cumulative purchase amount according to the ranking of the user in a case where the price of the commodity that the user will purchase is higher than the price of the same commodity at the other store. Not only the price of the commodity but also the difference in price from that of the other store are added to the cumulative purchase amount in a case where the user purchases the commodity more expensive than the commodity at the other store, and thus the user can find it advantageous to purchase the commodity. Therefore, more effective sales promotion can be achieved.

Moreover, in a case where the price of the commodity that the user will purchase is higher than the price of the same commodity at the other store, the additional amount based on the difference in price is displayed in the price information area 205 of the price information screen 204. Therefore, the user can be more effectively notified of the advantage to purchase the commodity. In addition, the user can properly select whether or not to purchase the commodity-to-be-purchased after checking the display.

Moreover, in a case where the price of the commodity that the user will purchase is higher than the price of the same commodity at the other store, the user information area 206 is displayed on the price information screen 204. In other words, the cumulative purchase amount (provisional cumulative purchase amount) and the rank which will be updated if the commodity-to-be-purchased is brought are displayed. Therefore, the user can know in real time how much the user should purchase to rank up while the user is shopping. Moreover, the motivation to purchase of the user who desires to rank up can be increased by displaying the updated rank.

Although the embodiment of the store system 1, the information processing apparatus, and the information processing method therefor has been described above, such an embodiment is not limited thereto.

In the above-mentioned embodiment, the case where the smartphone owned by the user is used as the mobile terminal 70 has been exemplified. For example, the mobile terminal 70 may be a tablet terminal attached to a shopping cart, a so-called cart terminal.

In the above-mentioned embodiment, the check-out processing is performed by using the check-out machine 60. The check-out processing does not need to be performed by the check-out machine 60.

In the above-mentioned embodiment, the additional amount is the amount calculated by multiplying the difference in price by the predetermined coefficient, for example, 100. The above-mentioned coefficient may be, for example, 10, 50 or the like.

In the above-mentioned embodiment, the processor 51 acquires the other store minimum price data in ACT33. The other stores are not limited to all the other stores. The other stores may be stores designated by the user in advance. For example, in ACT33, the processor 51 may acquire the minimum price data by comparing the prices of the same commodities of the designated stores registered by the user in advance with one another.

In the above embodiment, the virtual POS server 50 has been described as an aspect of the information processing apparatus. The information processing apparatus is not limited to that described in the above embodiment. The virtual POS server 50 further having the function as at least one server of the store server 10, the member server 20, the price management server 30, or the communication server 40 may be used as the information processing apparatus. In other words, the store server 10, the member server 20, the price management server 30, or the communication server 40 having the function as the virtual POS server 50 may be used as the information processing apparatus.

What is claimed is:

1. An information processing apparatus that ranks a user visiting an own store in accordance with a purchase amount of a commodity selected for purchase by the user, comprising:
   a communication interface that communicates with a mobile terminal used by the user visiting the own store and communicates with a management server that manages, for each of a plurality of users, a rank of the user and a cumulative purchase amount of the user, manages price information of the commodity sold at the own store, and manages a price of each commodity sold at a plurality of stores;
   a storage device that stores the rank of the user and the cumulative purchase amount of the user; and
   a processor that
      acquires an information command from the mobile terminal of the visiting user via the communication interface, the information command containing information about the user and information about the commodity that the user has selected for purchase,
      acquires the rank and the cumulative purchase amount of the user, who is authenticated on the basis of the information about the user contained in the information command, from the management server via the communication interface, and stores the acquired rank and the acquired cumulative purchase amount of the user in the storage device,
      acquires the price of the commodity at the own store from the management server via the communication interface on the basis of the commodity information contained in the information command,
      acquires the price of the commodity at another store from the management server via the communication interface,
      in a case in which the price at the own store is higher than the price at the other store, updates the cumulative purchase amount by adding an amount based on a difference between the prices at the own store and the other store to the cumulative purchase amount stored in the storage device, and
      updates the rank of the user stored in the storage device to a rank according to the updated cumulative purchase amount.

2. The information processing apparatus according to claim 1, wherein
   the processor in the case in which the price at the own store is higher than the price at the other store,
      sends the amount based on the difference between the prices to the mobile terminal via the communication interface,
      receives an instruction made by the user to purchase or not to purchase the commodity from the mobile terminal via the communication interface, and
      in a case of receiving the instruction made by the user to purchase the commodity, updates the cumulative purchase amount by adding the amount based on the difference between the prices to the cumulative purchase amount stored in the storage device.

3. The information processing apparatus according to claim 2, wherein
   the processor
      calculates a provisional cumulative purchase amount by adding the price of the commodity-to-be-purchased at the own store and the amount based on the difference between the prices to the cumulative purchase amount stored in the storage device of the user, and
      sends the calculated provisional cumulative purchase amount to the mobile terminal via the communication interface.

4. The information processing apparatus according to claim 3, wherein
   the processor sends a rank according to the calculated provisional cumulative purchase amount to the mobile terminal via the communication interface.

5. A store system, comprising:
   a mobile terminal used by a user visiting an own store;
   an information processing apparatus that ranks the user in accordance with a purchase amount of a commodity selected for purchase by the user visiting the own store; and
   a management server that manages, for each of a plurality of users, a rank of the user and a cumulative purchase amount of the user, manages price information of the commodity sold at the own store, and manages a price of each commodity sold at a plurality of stores, wherein
   the mobile terminal
      includes a wireless device that communicates with the information processing apparatus and
      sends an information command to the information processing apparatus via the wireless device, the information command containing information about the user and information about the commodity that the user has selected for purchase,
   the information processing apparatus includes
      a communication interface that communicates with the mobile terminal and communicates with the management server, a storage device that stores the rank of the user and the cumulative purchase amount of the user, and a processor that acquires the information command from the mobile terminal of the user via the communication interface, acquires the rank and the cumulative purchase amount of the user, who is authenticated on the basis of the information about the user contained in the information command, from the management server via the communication interface, and stores the acquired rank and the acquired cumulative purchase amount of the user in the storage device, acquires the price of the commodity at the own store from the management server via the communication interface on the basis of the commodity information contained in the information command, acquires the price of the commodity at another store from the management server via the communication interface, in a case in which the price at the own store is higher than the price at the other store, updates the cumulative purchase amount by adding an amount based on a difference between the prices at the own store and the other store to the cumulative purchase amount stored in the storage device, and updates the rank of the user stored in the storage device to the rank according to the updated cumulative purchase amount.

6. The store system according to claim 5, wherein
the processor of the information processing apparatus in the case in which the price at the own store is higher than the price at the other store, sends the amount based on the difference between the prices to the mobile terminal via the communication interface, receives an instruction made by the user to purchase or not to purchase the commodity from the mobile terminal via the communication interface, and in a case of receiving the instruction made by the user to purchase the commodity, updates the cumulative purchase amount by adding the amount based on the difference between the prices to the cumulative purchase amount stored in the storage device, and the mobile terminal further includes a touch panel that displays a price information screen including the amount based on the difference between the prices, which is received through the wireless device, and a button for receiving the instruction made by the user to purchase or not to purchase the commodity, and in a case in which the button receives the instruction made by the user to purchase or not to purchase the commodity, sends the instruction made by the user to purchase or not to purchase the commodity to the information processing apparatus through the wireless device.

7. The store system according to claim 6, wherein
the processor of the information processing apparatus
calculates a provisional cumulative purchase amount by adding the price of the commodity at the own store and the amount based on the difference between the prices to the cumulative purchase amount stored in the storage device of the user, and sends the calculated provisional cumulative purchase amount to the mobile terminal via the communication interface, and the touch panel of the mobile terminal
displays the calculated provisional cumulative purchase amount received through the wireless device on the price information screen.

8. The store system according to claim 7, wherein
the processor of the information processing apparatus
sends a rank according to the calculated provisional cumulative purchase amount of the user to the mobile terminal via the communication interface, and the touch panel of the mobile terminal
displays the rank of the user according to the calculated provisional cumulative purchase amount received through the wireless device on the price information screen.

9. The store system according to claim 5, wherein
the management server includes
a member server that manages, for each user, the rank of the user and the cumulative purchase amount of the user, a store server that manages the price information of the commodity sold at the own store, and a price management server that manages the price of each commodity sold at the plurality of stores.

10. An information processing method for an information processing apparatus that ranks a user visiting an own store in accordance with a purchase amount of a commodity selected for purchase by the user, the information processing apparatus including a communication interface that communicates with a mobile terminal used by the user visiting the own store and communicates with a management server that manages, for each of a plurality of users, a rank of the user and a cumulative purchase amount of the user, manages price information of the commodity sold at the own store, and manages a price of each commodity sold at a plurality of stores, the information processing method comprising:

acquiring an information command from the mobile terminal of the visiting user via the communication interface, the information command containing information about the user and information about the commodity that the user has selected for purchase;

acquiring the rank and the cumulative purchase amount of the user, who is authenticated on the basis of the information about the user contained in the information command, from the management server via the communication interface, and storing the acquired rank and the acquired cumulative purchase amount of the user in a storage device;

acquiring the price of the commodity at the own store from the management server via the communication interface on the basis of the commodity information contained in the information command;

acquiring the price of the commodity at another store from the management server via the communication interface;

in a case in which the price at the own store is higher than the price at the other store, updating the cumulative purchase amount by adding an amount based on a difference between the prices at the own store and the other store to the cumulative purchase amount stored in the storage device; and updating the rank of the user stored in the storage device to a rank according to the updated cumulative purchase amount.

* * * * *